Figure 1:
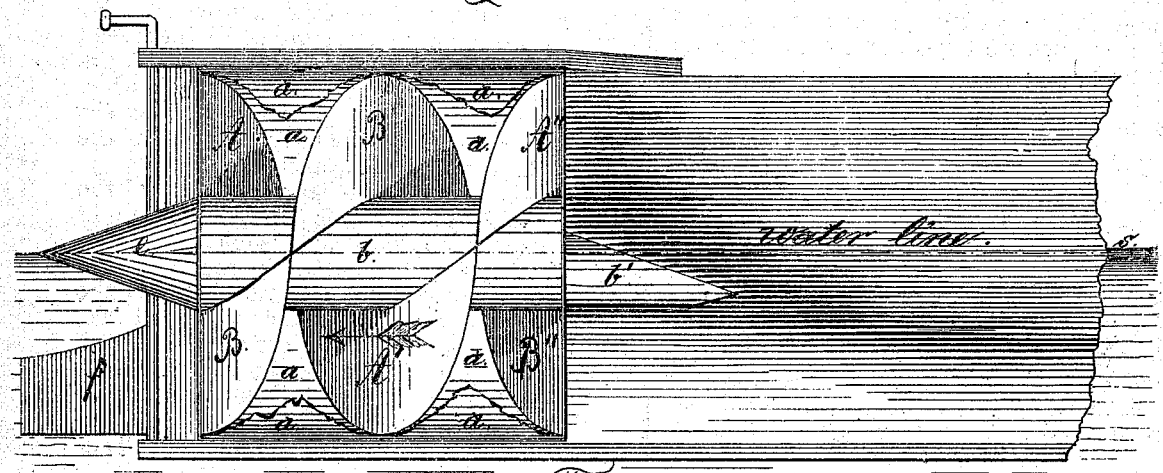

No. 119,155. Patented Sep. 19, 1871.

*Mathias Kolb's*

*Improvement in Screw Propellers.*

Witnesses:
Fr. Purchtauft
W. Kolb

Inventor:
Mathias Kolb

UNITED STATES PATENT OFFICE.

MATHIAS KOLB, OF NEW YORK, N. Y.

IMPROVEMENT IN SCREW-PROPELLERS.

Specification forming part of Letters Patent No. 119,155, dated September 19, 1871.

*To all whom it may concern:*

Be it known that I, MATHIAS KOLB, of the city, county, and State of New York, have invented an Improvement in Screw-Propellers, of which the following is a specification:

Section 1. The object of my invention is to reduce the slip of the screw-propeller by obviating lateral slip. I attain this object by combining in the construction of my screw-propeller the following three characteristic qualities: First, I submerge it but partly. Second, I incase it. Third, I produce its thread or threads to a certain extent.

Sec. 2. The thread or threads of my screw may be attached to the propeller-shaft. I prefer, however, to attach them to a cylinder of a larger diameter than the shaft. My screw is only to be submerged so far that the water does not rise above the propeller-shaft or the cylinder to which the screw-thread or threads are attached when the propeller is in motion.

Sec. 3. The case of my screw may either revolve with the screw or it may be stationary. If it revolves with the screw it should be attached to it and inclose it entirely. If the case is stationary it should be made to fit to the screw-thread or threads as close as may be done without incurring friction, at least so far as the water rises. If the case is stationary it will even be sufficient if it only extends so far as the water rises. I prefer to make the case stationary.

Sec. 4. In screw-propellers which are both incased and but partly submerged, as described, each screw-thread will, as long as its backward end is not submerged, impart to the water, which by its motion is sucked into the case or cylinder, a motion that is parallel to the line of the ship's motion. Likewise each thread will, after its forward end has emerged from the water, impart to the water, which by its motion is forced out of the case or cylinder, a motion that is parallel to the line of the ship's motion. (By the term "forward end of a thread," as used in the foregoing, I mean the preceding end of a thread. By the term "backward end," the end that follows. If the motion of the screw is reversed the ends of the threads will consequently change names.)

Sec. 5. The advantage that will be derived from an application of this principle stands in proportion to the extent to which the threads of the screw are produced. If the extent to which the threads are produced is very small this advantage becomes so small as not to compensate for the disadvantage incident to this form of propellers. It is only by producing the threads to a rather large extent that a real advantage will be attained. To attain any considerable advantage by the application of this principle the screw-thread or threads should not be produced to a smaller extent than one-third of a turn each. By further increasing the extent to which the thread or threads are produced the lateral motion of the water will be more and more obviated, until, when the thread or threads are produced to the extent described in section 6, the lateral motion of the water will be entirely prevented.

Sec. 6. To prevent the lateral motion of the water entirely each thread of my screw should be produced to an extent that is found by dividing one turn of a screw-thread by the number of threads that are to be used, and adding to the extent of thread found an extent of thread that has the same ratio to one turn of a screw-thread which the submerged part of the circumference of the screw's disk has to the whole circumference of the screw's disk. The submersion of the screw should be calculated according to the load-draft of the vessel.

Sec. 7. To guard against error I shall apply this rule in some examples. Suppose, for instance, only one screw-thread was to be used and the submersion was to be so that one-half of the circumference of the screw's disk was submerged. We would then have to divide one turn of a screw-thread by the number of threads that are to be used—that is, in the present instance, by one—the extent of thread found would be one turn. To this we would have to add an extent of thread that has the same ratio to one turn of a screw-thread which the submerged part of the circumference of the screw's disk has to the whole circumference of the screw's disk, which is equal to one-half of a turn. One-half of a turn added to one turn is equal to one turn and a half; therefore, if a single screw-thread is to be used and the submersion is to be so that one-half of the circumference of the screw's disk is submerged the single screw-thread will have to be produced to one turn and a half to prevent the lateral motion of the water entirely. Or, suppose that three screw-threads were to be used and the submersion was to be so that one-third of the circumference of the screw's disk was submerged, we would then have to divide one turn of a screw-thread by three, (the number of threads that are to be used.) The extent of thread found would be one-third of a turn. To this we would have to add an extent of thread that has the same ratio to one turn of a screw-thread which the submerged part of the circumference of the screw's disk has to the whole circumference of the screw's disk, which in the present instance is equal to one-third of a turn. One-third of a turn added to one-third is equal to two-thirds of a turn; therefore, if three threads are used and the submersion is so that one-third of the circumference of the screw's disk is submerged each screw-thread will have to be produced to two-thirds of a turn to prevent the lateral motion of the water entirely.

Sec. 8. Though the lateral slip will be entirely prevented by producing the threads to the extent described in section 6, yet the best result will not be attained by producing the threads to so large an extent on account of the very large friction between the water and the propeller. I find that the best result will be attained by producing the threads to an extent from one-half to about two-thirds of the extent described in section 6.

Sec. 9. In the following I give the exact proportions of the screw-threads, of which I expect the most favorable results: First, if the submerged part of the circumference of the screw's disk is not larger than one-third of the whole circumference of the screw's disk, either two or three threads may be used. If, in this case, three threads are used, each thread should be produced to the extent of one-third of a turn. If two threads are used, each thread should be produced to one-half of a turn. Second, if the submerged part of the circumference of the screw's disk is larger than one-third but not larger than one-half of the whole circumference of the screw's disk, two threads should be used and each thread should be produced to one-half of a turn. Third, if the submerged part of the circumference of the screw's disk is larger than one-half of the whole circumference of the screw's disk, either one or two threads may be used. If, in this case, two threads are used, each thread should be produced to an extent that has the same ratio to one turn of a screw-thread which the submerged part of the circumference of the screw's disk has to the whole circumference of the screw's disk. If only one thread is used, it should be produced to the extent of one turn. I consider it best to submerge at least one-half of the screw. I do not consider it advisable to use more than three threads.

Sec. 10. As regards the pitch of my screw the best results will be attained by making it large. A pitch that is equal be about two diameters of the screw will probably prove preferable to all others.

Sec. 11. The size of my screw depends on the resistance that the different vessels have to overcome while running with the same speed. The ratio of the submerged part of the screw's disk to the immersed midship section of the vessel should be largest in tugs and canal-boats. Again, it should be larger in vessels of small size than in those of large size. Also, it should be larger in those of inferior form than in those of good configuration. In tugs and canal-boats the submerged part of the screw's disk may be as large or even larger than the immersed midship section of the vessel. In vessels that are small but of good configuration for the speed at which they are to be run, a screw the submerged part of whose disk is equal to about one-third of the immersed midship section of the vessel will probably give the best result. In larger vessels the ratio should be smaller, until, in the very largest, if they are of good form, the submerged part of the screw's disk may be even smaller than one-sixth of the immersed midship section of the vessel. Experience will, however, help us in finding the most suitable size of the screw for every kind of vessels.

Sec. 12. My propeller may be applied to any part of the vessel, but the screw must, under all circumstances, protrude as far above the level of the water as described in section 2. Several of my screw-propellers may be applied to the same vessel.

There is one mode of applying my invention when several propellers should be applied to the same vessel. This case obtains when only one screw-thread is used in my propeller, and this one thread is produced to a smaller extent than two-thirds of a turn. In this case two propellers should be used. They should be connected by gearing or otherwise, and so arranged to each other that the forward end of the thread of the one is at its highest point while the forward end of the thread of the other is at its lowest point. The two screws should revolve in opposite directions.

Figure 2:
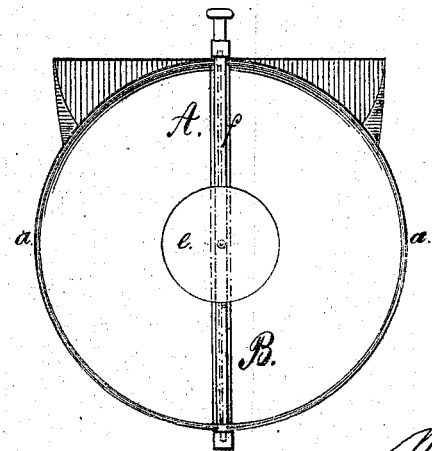

Figure 1 represents a side elevation of one of my propellers, the threads of which are produced to the extent described in section 6. Fig. 2 is an end elevation of the same.

Similar letters of reference in both figures represent corresponding parts.

$a$ is the shaft of the screw-propeller; $b$, the inner cylinder, to which the threads A A' A'' and B B' B'' are attached. The cylinder $b$ is itself attached to the shaft $a$. $c$ is the outer cylinder or case. $f$ is the rudder. The outer cylinder is stationary. That the inner cylinder may not act as an obstacle to the motion of the ship the lines of the ship form, for a small extent, a continuation of this cylinder, as represented at $b'$. To serve the same purpose at the other end of the cylinder a conic elongation, $e$, is attached to the framework of the propeller. In Fig. 1 the outer cylinder is represented as being partly broken away so as to expose the screw.

What I claim as new, and desire to secure by Letters Patent, is—

The combination, in the construction of screw-propellers, of the following three characteristic devices: First, that they are incased. Second, that they are but partly submerged. Third, that their thread or threads are produced to an extent each that is not smaller than one-third of a turn and not larger than the extent described in section 6 of my specification.

I disclaim the use of any one of these devices individually. I also disclaim the combination of any two of them.

MATHIAS KOLB.

Witnesses:
WILLIAM KOLB,
ANTHONY SEIFF. (98.)